April 8, 1930.    H. E. BURNS    1,753,597
METHOD OF FORMING LOCK NUTS
Filed May 4, 1927
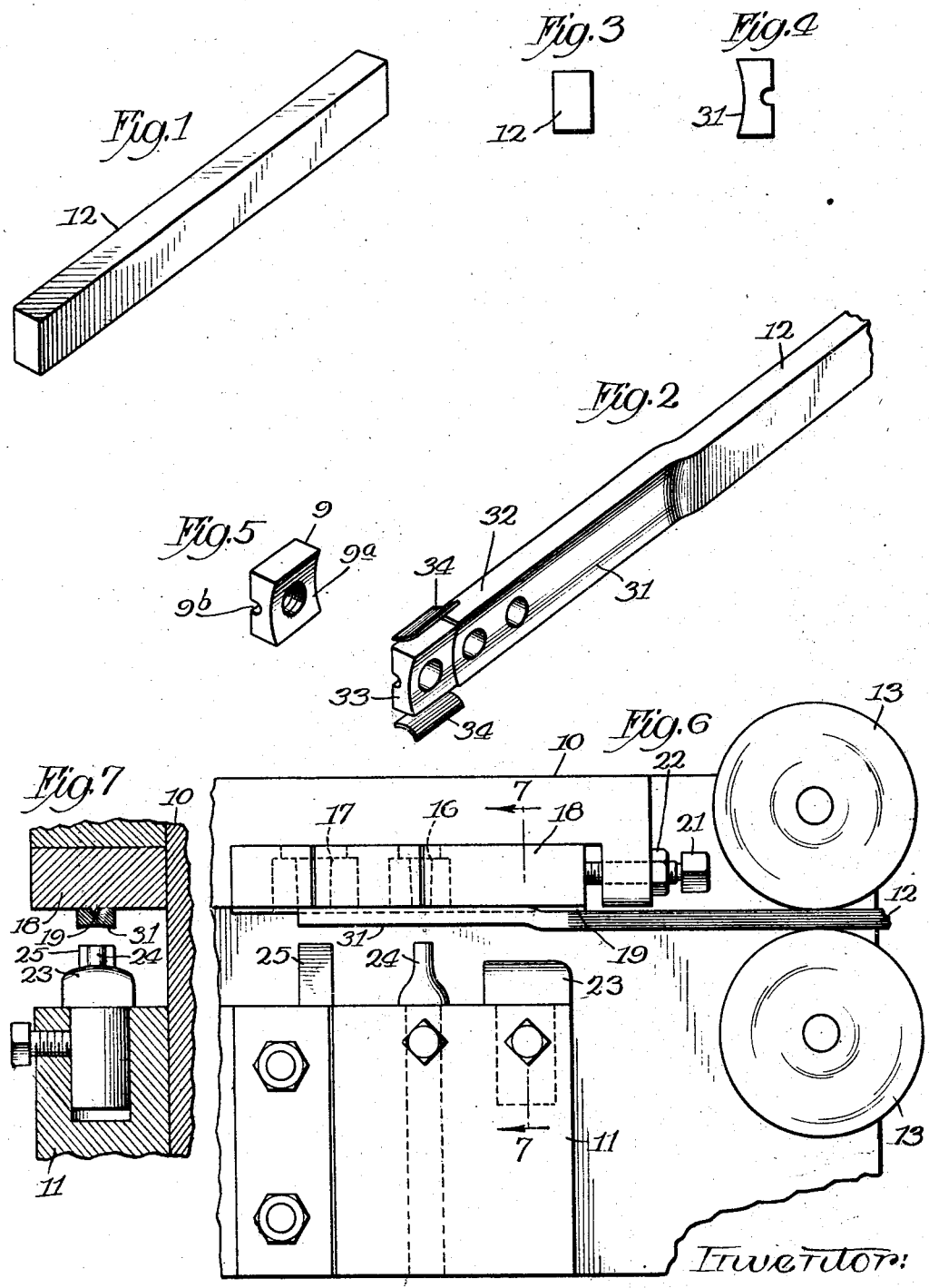
Inventor:
Harley E. Burns
By George E. Mueller Atty Patented Apr. 8, 1930

1,753,597

UNITED STATES PATENT OFFICE

HARLEY E. BURNS, OF COLUMBUS, OHIO

METHOD OF FORMING LOCK NUTS

Application filed May 4, 1927. Serial No. 188,614.

My invention relates in general to a method of and apparatus for producing a nut and more in particular to a novel method of and apparatus for producing the lock nut described in the co-pending application of Alexander W. MacLean, Serial No. 148,568, filed November 15, 1926.

One of the principal objects of my invention is to provide an improved method of manufacturing certain types of nuts.

Another object is to provide a method for making the nuts described in the co-pending application referred to above, economically.

Another object is to provide an improved nut making apparatus adapted to reduce the cost of manufacturing lock nuts.

To facilitate an understanding of my invention it may be said that the nut described in the co-pending application of MacLean, has recessed top and bottom faces, the bottom preferably concave, and the top with a somewhat narrow recess, or groove, adapted to close together to grip the threads of a bolt, when the nut is screwed down tightly enough against a surface to partially flatten the bottom concave face.

To manufacture this lock nut I employ bar stock of rectangular cross-section, of substantially the same thickness as the nut to be produced, but of less width than said nut. The nuts are produced continuously by a die stamping process which consists in first forming the recessed upper and lower surfaces, then punching out the holes, cutting the nut from the end of the stock and discharging the unthreaded blank into a suitable receptacle. The tapping and other subsequent operations may be the same as those employed for producing other types of nuts.

The invention will be more fully understood after reading the following detailed description and referring to the accompanying drawings, wherein:

Fig. 1 is a perspective view of a bar adapted to be used for forming the lock nut described;

Fig. 2 shows the bar as it is removed from the dies;

Fig. 3 is a cross-section of the bar shown in Fig. 1;

Fig. 4 is a section through the bar after the recessed surfaces are formed therein;

Fig. 5 is a perspective view of a finished nut;

Fig. 6 is a plan view illustrating the arrangement of the die blocks and

Fig. 7 is a fragmentary sectional view along the line of 7—7 of Fig. 6.

A square headed nut 9, formed in accordance with the co-pending application referred to, and which my invention aims to produce economically and well, is shown in Fig. 5. The top and bottom recesses are shown, as the nut has a concave bottom $9^a$ and recessed top $9^b$. It is believed that the details of the method by means of which this nut may be produced will be clearer after an understanding of the apparatus with which the method may be practiced. Reference may be had therefore, first to Figs. 6 and 7.

A stationary die block 10 is adapted to cooperate with a reciprocating punch block 11 to form nuts from a section of bar stock 12 fed to the dies by a pair of feed rollers 13. Any ordinary and usual means may be employed for operating the dies, and for synchronizing the movement of the feed rollers 13. In actual practice I have used the well known "Waterbury nut machine" and have obtained good results therewith, but of course the invention is not limited to the use of this type of machine.

The die block 10 constitutes the female portion of the die and is stationary. It is provided with a punch die 16 and a blanking die 17 held in position by a sectional die holder 18. The die holder and dies have a continuous transverse ridge 19 for producing the recess $9^b$ on the top face of the nut. The sectional die holder fits around the dies 16 and 17 and is held in place by a set screw 21 which is locked by means of a suitable nut 22.

The male portion of the die comprises a forming die 23, a punch 24, and a blanking die 25, all secured in the block 11 in any suitable manner. The forming die 23 forms the lower concave surface $9^a$ and forces the stock with such force against the ridge 19 as to result in the ridge entering the stock to form the recess 9$^b$. Any suitable means is provided for synchronizing the feed rollers 13 so that they will feed the stock a distance equal approximately to the width of the finished nut, so that at each actuation of the dies, a nut is stamped or cut from the formed end of the bar 12.

The forming die 23 is wider than a nut and its strokes overlap, so that each section of the bar receives several strokes and at least two full strokes from this portion of the tool. There is a space between each one of the three tools in the die so that a section of the bar between each of the tools which has been operated upon by the immediately preceding tool, and is ready for the next tool operation.

The blanking die 25 is of square cross section and fitted to the opening 17 in the female die block so that the two portions of the die cooperate to produce a finished blank. The end of the bar coincides with one edge of the punch, so that at each operatin of the die one blank is produced, and the only waste material is that trimmed from the longitudinal side edges of the bar. The space between the dies 24 and 25 may be made either equal to the width of a single nut (measured from center to center of the dies) or any multiple thereof. In this way the nuts are continuously produced and the finished blanks are forced through the opening 17 where they are received by suitable means (not shown) preparatory to tapping them.

The bar that is employed in the production of the nuts is narrower than the finished nut, but during the forming operation the metal pressed from the top and bottom of the bar causes a spreading action, thereby widening the bar. The thickness of the bar to begin with, may be the same or slightly greater than the greatest thickness of the finished nut.

Having described the apparatus, the steps of the method may be made clearer. A metal bar, preferably a mild steel, of rectangular cross-section, is selected, the bar being as thick as the finished nut but not as wide. The bar is then formed by a die in a swaging operation to have a recess on the top and bottom faces thereof, thereby resulted in a formed section of bar 31. The next step in the continuous sequence of operations is piercing the bar to produce a section of formed and pierced stock 32, which needs but the single final blanking operation to be a completed nut blank. All three steps of the method are performed and a completed blank 33 is cut from the formed and pierced bar at each actuation of the dies.

When the nuts are blanked out from the end of the bar, they are trimmed to the proper size, and this results in a small amount of stock in the form of a thin fin 34 being removed around the edges of the nut. It is this trimming which may cause the nut to be slightly thinner than the bar from which it is produced, as of course the formed bar is thinner toward the inside on account of the concave lower face.

When the nuts are produced in this manner they are preferably tumbled in the usual way to remove rough edges, and annealed to remove the strain of work. After this they are threaded on any of the threading machines which are well known in the art.

As an example of how my nut is produced, a specific example may be given of a three-eighths inch nut that is to be used with a three-eighths inch diameter bolt. The width of this nut across the flats, is five-eighths of an inch, while the thickness is five-sixteenths of an inch. To produce this nut I employ mild steel bar stock having a thickness of eleven-thirty-seconds of an inch and a width of one-half inch.

I have found that this method of producing the lock nut described, results in a very strong and easily handled nut, while at the same time the cost of production is very low. I am able to make this apparently complicated nut by means of my process, more economically than ordinary or common nuts without locking features.

The method has been described in some detail, and a specific form of mechanism illustrated in order to make the invention entirely clear to those skilled in the art; but I do not restrict myself to the exact features shown, and the invention is limited only by the scope of the appended claims.

I claim:

1. The method of forming lock nuts each having recessed top and bottom faces consisting of taking a rectangular bar of material, progressively forming said recessed top and bottom faces along the bar by opposed relatively reciprocating forming elements, progressively piercing the formed bar for each nut blank, and then cutting off each formed and pierced blank from the bar.

2. The method of forming a nut with a transverse recess in a top or bottom face thereof which comprises selecting metal stock of rectangular cross section, with less width than the finished blank, stamping the metal stock to form the recess and widen the stock, the metal of the recess serving to secure the greater width, punching tap holes in the blank, cutting the blanks from the bar, and threading the blanks.

3. The method of forming lock nuts of the character described each having recessed top and bottom faces which comprises supplying bar stock of rectangular cross-section, forming the recesses, punching the tap holes therein, and then cutting the nut from the stock, all of said steps being performed on the same stock at the same time, but the successive steps of the operation taking place at different points on the bar, so that the rectangular bar stock may be fed, and a continuous supply of nuts produced.

4. The method of forming lock nuts each having top and bottom recesses therein which comprises supplying bar stock of rectangular cross section, forming said recesses along the bar by a plurality of overlapping blows of suitable forming elements, progressively piercing the formed bar for each nut blank and cutting off each formed and pierced blank from the bar.

In witness whereof, I hereunto subscribe my name this 28th day of February, 1927.

HARLEY E. BURNS.